Jan. 3, 1950   R. R. ADAMS ET AL   2,493,331
CLOTHESLINE HANGER
Filed Aug. 1, 1947
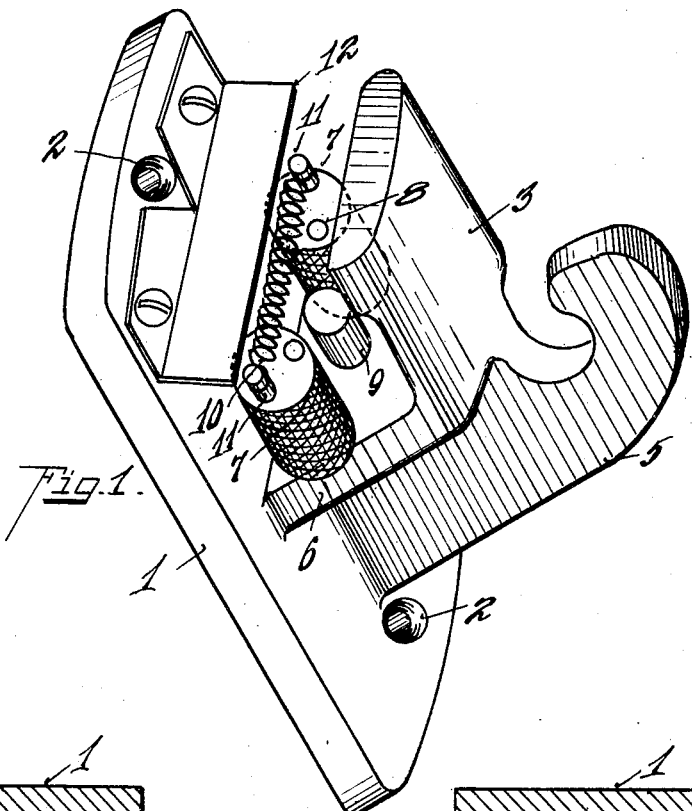
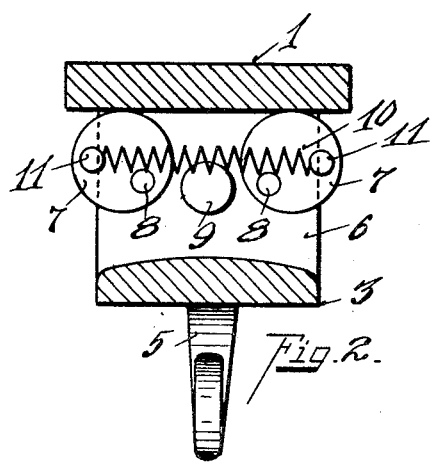
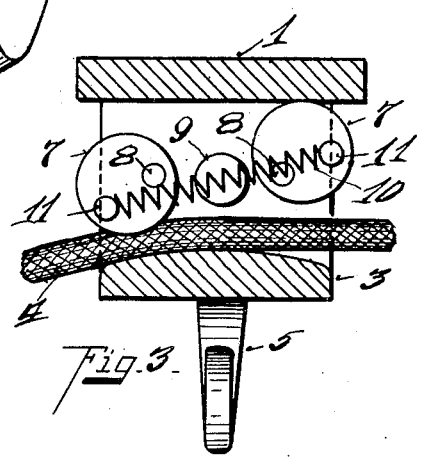
INVENTORS.
Robert R. Adams
Robert L. Henry
BY Oliver B. Kaiser
atty.

Patented Jan. 3, 1950

2,493,331

UNITED STATES PATENT OFFICE 2,493,331

CLOTHESLINE HANGER

Robert R. Adams, Cincinnati, and Robert L. Henry, Indian Hill Village, Ohio

Application August 1, 1947, Serial No. 765,572

1 Claim. (Cl. 24—134)

This invention relates to improvements in clothesline hanger or bracket hook.

An object of the invention is to provide a clothesline hanger characteristic as a hook adaptable for making a line slip-on application to the elimination of any knotting or looping connection therewith either for service at an end or intermediate of the length of the line and which will permit the line to be drawn to a taut condition initially or subsequently to take up any slack resulting from the stretching of the line under its load carrying weight and automatically locked or clamped against drawing motion in either one or alternate directions.

Another object is to provide a clothesline hanger or hook bracket with a pair of roller clamps adjoiningly arranged and functioning relatively reversely and independently, each for line impingement against the hook influenced by the line drawing or traction motion in one direction to withhold line movement, the clamps yieldingly coupled to adjustably and independently dispose the same in either active or inactive positions.

Various other features and advantages of the invention are more fully set forth in and apparent from the following description of the preferred embodiment as illustrated by the drawings accompanied herewith and forming a part of this specification, in which:

Figure 1 is a perspective view of the improved clothesline sustaining or hanging hook bracket.

Figure 2 is a cross section centrally horizontally therethrough illustrating the roller clamps adjustably disposed or set to an inactive position.

Figure 3 is a section similar to Figure 2 with one of the roller clamps in an active position and engaged against a line.

Referring to the drawings 1 indicates the base of the hanger or hook bracket, suitably apertured, as by a pair of apertures 2, 2, respectively at the top and bottom ends of the base and centrally thereof for traversing a screw or bolt to fasten the bracket to a support or post. This however is optional recognizing that various other methods can be employed for installing the hanger upon a support or post. A hook 3 extends laterally and centrally from the face side of the base preferably of right angle form and having the inner face of its perpendicular beak arched or curved crosswise of its width against which a clothesline 4 bears. A rib 5 depends centrally from the shank portion of the hook and extends forwardly therebeyond and the projecting end within its upper side has a notch therein of a configuration to provide an auxiliary hook.

The shank 6 of the hook has a plane top for a bearing support for an end of each of a pair of roller clamps 7, 7, in spaced adjoining arrangement each respectively eccentrically journaled or swiveled upon a pin 8 fixed to the shank and extending perpendicularly from the upper side thereof. The pins 8 as the axes for the roller clamps are in alignment and preferably centrally of the spacing between the base and beak of the hook to provide sufficient clearance at opposite sides thereof to permit the roller clamps to be adjusted and set to either an active or inactive position. In an inactive position the roller clamps peripherally bear against the base of the bracket and in an active position have their swing limited or arrested by a stud 9, as a machine bolt secured into the shank of the hook centrally of the axes of the clamps.

The roller clamps are yieldingly coupled by a spring 10, having one end connected by a pin 11 fixed to and extending from the upper end of one clamp while its opposite end is correspondingly connected to the second roller clamp. The clamps thus can be swung and yieldingly held in either an active or inactive position and each in an active position is under spring tension compressively against the line interposed between the clamp and beak of the hook. The peripheral surfaces of the clamps are knurled and under the tension of the spring have a traction hold on the line so as to move with and wedgingly grip the line in one direction of line draw and release in a reverse direction.

To facilitate the line insertion within the hook, the roller clamps are guarded in their inactive position by a shield 12, fixed to and extending crosswise of the base of the bracket. The shield as an obtusely angled plate provides a downwardly inclined flange projecting from the base overlies the roller clamps when in their inactive position and being spaced from the beak of the hook, the shield guidingly directs the line between the clamps and beak.

As the hanger is applicable for service for making a line connection therewith, either at one or both of its ends or intermediate of its length, therefore for a line connecting end only one of the roller clamps is required as the second would be ineffective, the selection depending on whether the line extends in a right or left direction from the hanger. As an example, for one mode of hanging a line, one end thereof is applied upon the hook and gripped by one of the roller clamps to hold it fast to the hook while spanning the line upon one or more intermediately located hangers and one for fastening the opposite end of its length if it is not returned to the first hanger. The roller clamps of the hangers located intermediate of the length of the line preliminarily are set to an inactive position so that the line can be loosely slipped upon the hooks of the hangers of a series to permit the line to be drawn to a taut condition from either one or both ends. Upon adjusting a relative one of the roller clamps of the intermediately located hangers the line can be drawn for tautness in one direction and automatically locked against any retreating movement. With both roller clamps of an intermediate hanger set in active position strain on a strand of the line from one side of the hanger will not be transmitted to a strand extending from the opposite side of the hanger. As another example, a line can be stretched between a pair of hangers with a pair of strands in parallelism and both terminals of the line connected to one of the hangers, which permits both strands to be individually gripped and locked against retraction and any stretching of one strand by the weight carried will not effect the second strand.

Having described our invention, we claim:

A clothes line hanger, comprising a bracket having a base with a hook extending from one side thereof, the shank of the hook having a plane upper side and the beak extending perpendicular to the upper side of the shank with its inner side arched crosswise for a bearing contact of a clothesline and a pair of roller clamps adjoiningly disposed and each eccentrically journaled upon the upper side of the shank of the hook intermediate of the base of the bracket and beak, the base limiting the movement of the clamps in an inactive position, the clamps independently operable for peripherally engaging and wedgingly impinging a clothesline against the inner surface of the beak upon which the line bears to withhold line movement in one direction and in an opposing direction to that of the other clamp and conjointly to withhold the line against movement in alternate directions, said clamps spring coupled to yieldingly urge and sustain the same collectively and independently in either an active or inactive position and in an inactive position under tension in bearing contact with the base of the bracket.

ROBERT R. ADAMS.
ROBERT L. HENRY.

REFERENCES CITED

The following references are of record in the file of this patent:

UNITED STATES PATENTS

| Number | Name | Date |
| --- | --- | --- |
| 593,256 | Velie | Nov. 9, 1897 |
| 801,455 | Herald | Oct. 10, 1905 |
| 950,434 | Carlsen | Feb. 22, 1910 |
| 1,202,503 | Fortier | Oct. 24, 1916 |
| 1,250,876 | Hicks | Dec. 18, 1917 |
| 1,373,349 | Peardon | Mar. 29, 1921 |
| 1,382,046 | Zimmerman | June 21, 1921 |
| 1,737,406 | Bocchino | Nov. 26, 1929 |

FOREIGN PATENTS

| Number | Country | Date |
| --- | --- | --- |
| 339,948 | France | June 22, 1904 |